UNITED STATES PATENT OFFICE 2,668,807

EPOXIDE COMPOSITIONS

Sylvan Owen Greenlee, Racine, Wis., assignor to Devoe & Raynolds Company Inc., Louisville, Ky., a corporation of New York No Drawing. Application April 8, 1952,
Serial No. 281,264

16 Claims. (Cl. 260—47)

This invention relates to new polyepoxy products and compositions resulting from the reaction of polyhydric phenols and polyepoxides in regulated proportions which are valuable compositions for use in the manufacture of varnishes, molding compositions, adhesives, films, fibres, molded articles, etc. The invention includes the new polyepoxy products and compositions and methods for their production, and articles and products made therefrom.

This invention relates more particularly to a two-step process of making high melting point resins and final infusible products by first reacting a dihydric phenol with an excess of an aliphatic polyepoxide, to form an intermediate reaction product which is a polyepoxide and further reacting this intermediate product with a further amount of dihydric phenol to form a higher melting point resin or an infusible reaction product.

The polyhydric phenols used in making the new products and compositions include phenols containing two or more phenolic hydroxyl groups which may be in one nucleus as in resorcinol or in different nuclei of fused ring systems as in 1,5-dihydroxy naphthalene, or in different nuclei of ring systems attached by chains composed of one or more atoms, in which case the chains should be free from elements which interfere with the reaction of the polyepoxides with the phenolic hydroxyl groups. The phenolic nuclei or the chains linking phenolic nuclei may contain substituents providing they do not interfere with the desired reaction of the polyepoxide with the phenolic hydroxyl groups. Illustrative of polyhydric phenols which may be used in making the new complex polymerization products are mono-nuclear phenols such as resorcinol, hydroquinone, catechol, phloroglucinol, etc. and polynuclear phenols such as bisphenol (p,p'-dihydroxy diphenyl dimethyl methane), p,p'-dihydroxy benzophenone, p,p'-dihydroxy diphenyl, p,p'-dihydroxy dibenzyl, bis-(4-hydroxy phenyl) sulfone, 2,2'-dihydroxy 1,1'-dinaphthyl methane, polyhydroxy naphthalenes and anthracenes, o'-p'-tetrahydroxy diphenyl dimethyl methane and other dihydroxy or polyhydroxy diphenyl or dinaphthyl dialkyl methanes, etc.

The polyhydric phenols may also be complex reaction products of simpler polyhydric phenols, such as bisphenol, with dichlorides, such as dichlordiethyl ether, dichlorbutene, etc. in the presence of caustic soda and in proportions so that the resulting reaction products will contain terminal phenolic hydroxyl groups. Thus a complex polyhydric phenol may be produced from bisphenol with dichlordiethyl ether and caustic alkali which may be assumed to have the following formula:

in which R is the residue from bisphenol and $n$ indicates the degree of polymerization which may be, e. g., 1, 2, etc. Complex polyhydric phenols from, e. g., bisphenol and dichlorbutene with the use of caustic alkali may be assumed to have the following general formula:

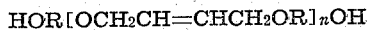

in which R and $n$ have the meaning indicated above. The complex polyhydric phenols thus produced from dichlorides and simpler polyhydric phenols are more complex or polymeric products in which, e. g., two simpler dihydric phenol residues are united through a residue from the dichloride. With less than two molecular proportions of the simpler dihydric phenol to one of the dichloride, and with the simpler dihydric phenol used in excess of the dichloride, a polymeric product is produced in which, e. g., 3 mols of dihydric phenol are reacted with 2 mols of dichloride; or to give products of a higher degree of polymerization.

In special cases complex polyhydric phenols may be used which are produced by the reaction of dibasic acids with polyhydric phenols such as bisphenol to give products which, in the case of the use of adipic acid with bisphenol, may be considered to have the following formula:

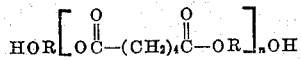

in which R is the residue from the bisphenol and $n$ the degree of polymerization. Similar products can be made from other dibasic acids.

The polyepoxides used for reaction with the polyhydric phenols contain two or more epoxide groups. The simplest diepoxides will contain at least four carbon atoms, as in the case of 1,2-epoxy-3,4-epoxy butane. The epoxy groups may be separated from each other by ether groups or linkages as in the case of bis-(2,3-epoxy propyl) ether, bis-(2,3-epoxy 2-methyl propyl) ether, etc. The polyepoxides may also also be of a somewhat more complex character such as those which result from the reaction of 2 or more mols of a diepoxide with 1 mol of a dihydric phenol, or the reaction of 3 or more mols of a diepoxide with 1 mol of a trihydric phenol, etc. Diepoxides or polyepoxides derived from polyhydric alcohols such as mannitol, sorbitol, erythritol or polyallyl alcohol may also be used. The polyepoxy compounds used may have varying structures and may be of complex structure so long as they do not contain groups which interfere with the reaction between the epoxide groups and the phenolic hydroxyl groups. The polyepoxides are free from reactive groups other than epoxide and aliphatic hydroxyl groups.

The simpler diepoxides can be produced and obtained of a high degree of purity by fractional distillation to separate them from byproducts formed during their manufacture. Thus bis-(2,3-epoxy propyl) ether or diglycid ether can be produced and separated by fractional distillation to give products of high purity, e. g., around 97% or higher as determined by the method of epoxide analysis hereinafter referred to. When polyepoxides are produced of higher molecular weight and which are difficult to isolate by fractional distillation they can nevertheless be advantageously used, after purification to remove objectionable inorganic impurities and catalysts such as caustic alkali and without separation of the diepoxides or polyepoxides from admixed byproducts such as monoepoxide products, etc. Valuable polyepoxides for use in making the new compositions can be obtained by the reaction of epichlorhydrin on polyhydric alcohols containing 3 or more hydroxyl groups. Thus a trihydric alcohol such as glycerol or trimethylol propane can be reacted with epichlorhydrin in the proportions of 1 mol of trihydric alcohol to 3 mols of epichlorhydrin, using a catalyst which will promote the reaction of the epoxide group of the epichlorhydrin with a hydroxyl group of the alcohol, and with subsequent treatment of the reaction product to remove chlorine from the reaction product and to produce a polyepoxide. Such polyepoxides may contain, e. g., approximately 2 epoxy groups per molecule, even though 3 mols of epichlorhydrin are reacted with 1 mol of a trihydric alcohol. More complex or side reactions apparently take place which result in the production of products containing free hydroxyl groups or cyclic ring compounds or polymeric compounds which may be present in the resulting product. But such polyepoxide products can nevertheless advantageously be used as polyepoxides for reaction with polyhydric phenols in forming the new compositions.

The polyepoxides used may contain small and varying amounts of admixed monoepoxides. To the extent that monoepoxides are present they will react with the polyhydric phenols to form terminal groups or residues containing hydroxyl groups and to the extent that such terminal hydroxyl groups are present the complex polyepoxide compositions will contain complex epoxy-hydroxyl compounds containing both terminal epoxide-containing residues and terminal hydroxyl-containing residues. The presence of monoepoxides or of monoepoxy-hydroxyl compounds does not interfere with the production of the new products provided a sufficient amount of polyepoxides is present to serve as polyfunctional reactants with the polyhydric phenols. The presence of monoepoxy hydroxyl compounds may be desirable and advantageous. During the final hardening operation and at higher temperatures the epoxy groups may react with hydroxyl groups to form more complex reaction products.

In the case of the reaction of a dihydric phenol with a diepoxide the simplest diepoxide composition made from 2 mols of diepoxide to 1 of dihydric phenol may be considered to have the following general structure or formula:

$$R_1-O-R-O-R_1$$

where R is the residue of the dihydric phenol and $R_1$ is an epoxy-hydroxy-containing residue of the diepoxide used. Thus in the case of the diepoxide from butylene dioxide and a dihydric phenol in the proportion of 2 mols of butylene diepoxide to 1 of dihydric phenol the resulting diepoxide may be considered to have the following formula or structure:

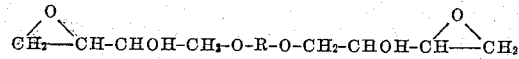

in which R is the residue of the dihydric phenol. It will be seen from the above formula that each terminal group or residue united to the dihydric phenol by an ether linkage contains both an epoxy group and a hydroxyl group.

In the case of more complex polymeric products, and assuming the formation of a straight chain polymer, the polymeric products may be considered to have the following formula or structure:

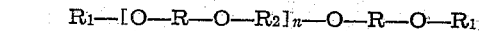

$$R_1-[O-R-O-R_2]_n-O-R-O-R_1$$

in which $R_1$ and R have the meaning above indicated and $R_2$ is a residue of the diepoxide containing e. g., 2 hydroxyl groups and $n$ indicates the degree of polymerization e. g., $n=1$ or more.

The above formula assumed a straight chain polymeric reaction in which the epoxide groups of the diepoxide react only with phenolic hydroxyls. The diepoxides may, however, react through one of their epoxide groups with an intermediate alcoholic hydroxyl to form branch chain polymers or polyepoxides.

The intermediate polyepoxides which result from the reaction of a dihydric phenol with an excess of aliphatic polyepoxide are further reacted in the second step of the process with a further amount of dihydric phenol to form a higher melting point resin or to form a final infusible reaction product, depending upon the proportions used and the conditions of the reaction.

In general, the proportions of polyepoxide and polyhydric phenol should be such that the polyepoxide used is in excess of that which is equivalent to the polyhydric phenol so that all of the phenolic hydroxyls will be reacted with the polyepoxide and so that the terminal groups will be epoxide-containing groups. Thus, in general, the proportion of polyepoxide may be twice or more than twice that equivalent to the polyhydric phenol. In general, in the case of dihydric phenols and diepoxides, the proportion of diepoxide to dihydric phenol should be more than 1 mol of diepoxide to 1 mol of dihydric phenol and may be greater than 2 mols or more of diepoxide to 1 mol of dihydric phenol, e. g. 3 mols of diepoxide to 2 mols of dihydric phenol, or 4 mols of diepoxide to 3 mols of dihydric phenol, or 5 mols of diepoxide to 4 mols of dihydric phenol, etc.

Assuming complete reaction between all of the phenolic hydroxyl groups with epoxide groups, and assuming a straight chain reaction and polymerization, the number of intermediate diepoxy residues will be one less than the number of phenolic residues, and the number of terminal epoxide residues containing epoxide groups will be sufficient to satisfy the remaining phenolic hydroxyls, i. e., 2 in the case of a dihydric phenol. To the extent that diepoxides react with alcoholic hydroxyl groups additional terminal epoxy-containing groups may also be present.

Thus, in the case of a diepoxide made from 3 mols of a simple diepoxide such as butylene diepoxide or bis-(2,3-epoxy propyl) ether and 2 mols of bisphenol, and assuming the formation of a straight chain polymer, the resulting compound would correspond to the above formula in which $n=1$, in which R represents the two bisphenol residues, $R_2$ the intermediate dihydroxyl-containing residue from the diepoxide, and $R_1$ the two end components or residues each containing an epoxide and a hydroxyl group.

With higher polymeric products, corresponding to a composition in which $n$ is more than 1, and particularly in the still higher polymeric products, the reaction may take place in stages to produce intermediate reaction products of intermediate molecular weight and which may still contain some unreacted phenolic hydroxyl groups capable of further reaction with epoxide groups in a subsequent stage of reaction.

The intermediate reaction products produced according to the present invention are polyepoxy-polyhydroxy products. Even with 2 mols of diepoxide reacting with 1 mol of dihydric phenol the product will contain two hydroxyl groups as well as two epoxy groups. With complex polymeric products the number of hydroxyl groups will increase and one alcoholic hydroxyl group will be formed whenever an epoxide group reacts with a phenolic hydroxyl. The reaction of an epoxide group with an alcoholic hydroxyl group will not decrease or increase the number of hydroxyl groups. In products of higher degree of polymerization an increased number of hydroxyl groups will be present. Thus, a product made from 6 mols of a diepoxide such as butylene diepoxide or bis-(2,3-epoxy propyl) ether and 5 mols of bisphenol, and assuming the formation of a linear polymer such as illustrated in the above formula, the compound produced will contain two epoxy groups and ten hydroxyl groups.

The reaction of the polyhydric phenols and polyepoxy compounds can readily be accomplished by heating the reactants together for a short time. In general, reaction temperatures of around 50–250° C. can be used. The temperature and time for any given reaction depend on the proportions and reactivity of the reactants and whether the reaction is to be carried to completion or to an intermediate stage. In some cases it is advantageous to add traces of basic catalyst such as caustic alkali to the mixtures of polyepoxide and polyhydric phenol, although in many if not most cases heat alone is sufficient to produce the required reaction and particularly in the case of intermediate reaction products of a resinous character.

The degree of polymerization can in part be regulated by regulating the proportions of excess polyepoxide used. Thus, when all of the phenolic hydroxyls have reacted with epoxide groups and the excess epoxide equivalent is present as terminal epoxide groups, the reaction is complete so far as terminal phenolic hydroxyls and polyepoxide is concerned. The tendency of the reaction appears to be one primarily between phenolic hydroxyls and epoxide groups, although reaction between epoxide groups and alcoholic hydroxyl groups may take place to some extent, particularly in the later stages of reaction.

The invention will be further illustrated by the following specific examples, but it will be understood that the invention is not limited thereto.

The first two examples illustrate the preparation of special polyepoxides from epichlorhydrin and trihydric alcohols.

*Example I.*—In a reaction vessel provided with mechanical stirrer and external cooling means was placed 276 parts (3 mols) of glycerol and 828 parts (9 mols) of epichlorhydrin. To this reaction mixture was added 1 part of 45% boron trifluoride ether solution diluted with 9 parts of ether. The reaction mixture was agitated continuously. The temperature rose to 50° C. over a period of 1 hour and 44 minutes at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium aluminate. With continuous agitation this reaction mixture was gradually heated to 93° C. over a period of 1 hour and 51 minutes and held at this temperature for 8 hours and 49 minutes. After cooling to room temperature the inorganic material was removed by filtration. The dioxane and low boiling products were removed by heating the filtrate to 205° C. at 20 mm. pressure to give 261 parts of a pale yellow product.

This product can be distilled at temperatures above 200° C. at 2 mm. pressure provided it is sufficiently freed from impurities but unless care is taken it is liable to undergo a violent exothermic reaction. It is not, however, necessary to purify this product by distillation since such byproducts as are present do not interfere with the use of the product as a polyepoxide.

The epoxide equivalent of this product was determined by titrating a one gram sample with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering 1 HCl is equivalent to one epoxide group.

The epoxide equivalent represents the equivalent weight of the product per epoxide group. The epoxide equivalent so determined was 149. The molecular weight as determined by a standard boiling point elevation method was 324. This represents an average of 2.175 epoxide groups per molecule, assuming the determined molecular weight is the molecular weight. It is probable that the molecular weight is an average molecular weight of a product containing more than one reaction product. The average molecular weight is higher than that which would correspond to a product made up solely of the reaction product of 1 mol of glycerol with 3 mols of epichlorhydrin and it seems probable that complex reaction products are also formed, some of which may be of a polymeric or cross-linked nature. The product is, however, a valuable product for use as a polyepoxide in making the new compositions.

*Example II.*—By a procedure similar to that described in Example I, 1 mol of trimethylol propane and 3 mols of epichlorhydrin were condensed with boron trifluoride and finally treated with sodium aluminate to give 299 parts of a pale yellow liquid. The product had an equivalent weight to epoxide of 151 and an average molecular weight of 292.2.

This corresponds to approximately 1.94 epoxide groups per molecule, assuming an average molecular weight.

The product of this example can also be distilled at high temperatures and low pressures to give a water white liquid, but such further purification is not necessary and the product obtained can be directly used in making the new compositions. Or the purified product can be produced and similarly used.

The procedure of Examples I and II can be used in preparing complex polyepoxy products from other polyhydric alcohols containing 3 or more hydroxyl groups, for example, from higher molecular weight alcohols containing 3 hydroxyl groups or from higher polyhydric alcohols such as mannitol, sorbitol, erythritol or polyallyl alcohol. For example, a polyepoxide has been obtained from polyallyl alcohol and epichlorhydrin which contained 2.45 epoxide groups per average molecular weight. In general, with polyepoxides made by the reaction of epichlorhydrin on polyhydric alcohols containing 3 or more hydroxyl groups, the number of epoxide groups per molecule (based on average molecular weight) has been found to be materially less than that corresponding to 1 epoxide group per molecule of epichlorhydrin used; but in general polyepoxides can be so produced containing an equivalent of around 2 or more epoxide groups per molecule which are valuable polyepoxides for use in making the new compositions and reaction products of the present invention.

The following examples, III, IV, V and VI, illustrate the preparation of some of the more complex polyhydric phenols for use in making the new compositions.

*Example III.*—In a reaction vessel provided with a reflux condenser and a mechanical stirrer was placed 101.5 parts (0.445 mols) of bis phenol and 68 parts (0.666 mols) of acetic anhydride. This reaction mixture was refluxed for 1 hour with continuous agitation. To this partially acetylated bis phenol was added 187 parts (0.333 mols considered as dimeric acids) of polymerized soy bean oil acids. These polymerized acids were prepared by heating the methyl esters of soy bean acids at 325° C. in the presence of anthraquinone followed by removal of unpolymerized methyl esters by vacuum distillation and liberation of the polymerized acids from the residual polymerized methyl esters by saponification. With continued agitation this reaction mixture was heated at 250 to 260° C. until the theoretical amount of acetic acid displaced was removed by distillation and the acid value of the resulting product had reached 3.4. The product was a viscous sticky product.

The product of this example may be considered a polyhydric phenol in which the bis phenol residues are united through the residues from the dibasic acid and illustrates the preparation of special polyhydric phenols from simpler polyhydric phenols.

*Example IV.*—In a reaction vessel provided with a reflux condenser and a mechanical stirrer was placed 107 parts (0.5 mol) of 1,4-dibromobutene, 171 parts (0.75 mols) of bis phenol, 40 parts (1 mol) of sodium hydroxide and 200 parts of water. This reaction mixture was refluxed for 6 hours with continuous agitation. The upper water layer was removed by decantation and the product was washed three times by stirring with boiling water. The theoretical yield of a product softening (Durrans Mercury Method) at 70° C. was obtained.

*Example V.*—A polyhydric phenol was prepared by the reaction of 3 mols of bis phenol and 2 mols of β,β'-dichlorodiethyl ether with 8 mols of potassium hydroxide and 1 liter of water. The procedure was the same as that in Example IV except the reaction time was refluxing for 48 hours. The product softened at 61° C.

Examples IV and V illustrate the production of complex polyhydric phenols by the reaction of simpler polyhydric phenols (e. g., bis phenol) with dichlorides.

*Example VI.*—In a reaction vessel provided with a reflux condenser and a mechanical stirrer was placed 184 parts (0.805 mols) of bis phenol, 88 parts (0.602 mols) of adipic acid and 121 parts (128 mols) of acetic anhydride. This reaction mixture was heated at 240–255° C. with continuous agitation, until the acetic acid was removed and the product had an acid value below 5. This product had a softening point of 82° C.

This example, like Example III, illustrates the production of special, complex polyhydric phenols in which the residues of the simpler polyhydric phenols are united through dibasic acid residues.

The following examples illustrate the production of intermediate diepoxides from polyhydric phenols and polyepoxides.

*Example VII.*—To 4.3 parts of diglycid ether and 2.2 parts of hydroquinone was added 0.02 part of sodium phenoxide. This reaction mixture was heated at 100° C. for 1 hour to give a sticky viscous product. This product was shown by analysis to have an epoxide equivalent of 350.

*Example VIII.*—To 4.6 parts of bis phenol and 4.3 parts of diglycid ether was added 0.032 part of 20% sodium hydroxide and the resulting mixture heated for 45 minutes at 100° C. to give a semi-solid material containing one epoxide group per 371 parts.

*Example IX.*—To 7.5 parts of p,p'-dihydroxy diphenyl sulfone and 7.5 parts of diglycid ether was added 0.006 part of sodium hydroxide and the resulting mixture was heated for 86 minutes at 100° C. to give a product containing 1 epoxide group per 315 parts.

*Example X.*—To 29.8 parts of the product of Example I was added 11.4 parts of bis phenol and this mixture was heated gradually to 173° C. and held at 162–173° C. for 2 hours. The resulting product was a viscous, tacky syrup having an epoxide equivalent of 479.

*Example XI.*—To 50 parts of the product of Example II was added 19 parts of bis phenol and the resulting mixture was heated for 2 hours and 10 minutes at 162 to 186° C. to give a soft tacky resin having an epoxide equivalent of 440 and a molecular weight of 828.

The two step process of making higher melting point resins and final infusible products by first reacting a dihydricphenol with an excess of an aliphatic polyepoxide to form an intermediate reaction product which is a polyepoxide and the further reacting of this intermediate product with a further amount of dihydricphenol is illustrated by the following examples:

*Examples XII.*—To 46 parts of bis phenol and 43 parts of diglycid ether was added 0.32 part of 20% sodium hydroxide. The resulting mixture was heated for 75 minutes at 100° C. to give a semi-solid product having a Durran's softening point of 53° C. and an epoxide equivalent of 399.

To 40 parts of this intermediate polyepoxide was added 5.72 parts of bis phenol and the resulting mixture was heated at 100° C. for 30 minutes to give a higher melting epoxide resin having a softening point of 73° C. and an epoxide equivalent of 778.

*Example XIII.*—To 59.6 parts of the product of Example I was added 22.8 parts of bis phenol. This mixture was heated at 160° C. for 2 hours to give a viscous, semi-solid product having a softening point of 39° C. and an epoxide equivalent of 531.

To 20 parts of the intermediate epoxide product thus produced was added 2.15 parts of bis phenol. The mixture was heated at 160° C. for 30 minutes to give a product having a softening point of 65° C. and an epoxide equivalent of 936.

In these examples the amount of dihydricphenol used with the intermediate polyepoxide is less than the equivalent proportion so that a higher melting point epoxide resin is produced which is still capable of further reaction in the presence of an alkaline catalyst to form a final infusible, insoluble product.

In a similar manner, other intermediate polyepoxides, resulting from the reaction of a dihydricphenol with an excess of aliphatic polyepoxide, can be used for further reaction with a dihydricphenol. Thus, the intermediate polyepoxides produced from 2 mols of hydroquinone and 3 mols of diglycid ether in Example VII, or from 2 mols of bis phenol and 3 mols of diglycid ether, as in Example VIII, or from 1 mol of p-p'-dihydroxy diphenyl sulfone and 2 mols of diglycid ether, as in Example IX, or from 1 mol of bis phenol and 2 mols of the product of Example I, as in Example X, can be similarly used and further reacted with additional dihydricphenol to form higher melting point epoxide resins with an amount of dihydricphenol less than the equivalent amount.

By using a larger proportion of dihydricphenol with the intermediate polyepoxide, such as equivalent proportions of phenolic hydroxyl and epoxide groups, or approximately the equivalent proportions, final infusible, insoluble products can be obtained.

The compositions containing the intermediate polyepoxides added to dihydricphenol, are themselves valuable compositions which can be used for making higher melting point epoxides, or for making final infusible insoluble films, or molded products, etc. Similarly, the higher melting point epoxide resins resulting from the further reaction of such a reaction mixture are also valuable epoxide resins for further reaction to make insoluble, infusible products.

The new polyepoxide-polyhydroxy products produced by the two-step process of the present invention are valuable products in the manufacture of varnishes, molding compositions, adhesives, etc., being capable of polymerization to give compositions varying from hard, brittle, fusible solids to hard, non-brittle, infusible solids and giving polymerization products containing a high percentage of hydroxyl groups.

It is a characteristic of the two-step process of the invention and the production of the new polyepoxide products and compositions thereby that no by-products are formed and the reaction takes place directly in a dry state between epoxide groups and phenolic hydroxyl groups. Accordingly, the reaction can be carried out by using the ingredients in the second step of the process in solution in organic solvents or in molding compositions, and carrying out the reaction after the solution has been applied or to the molding composition in the mold, with heating to effect the reaction and to bring about directly the final reaction product. By using the polyhydric phenol and polyepoxide in approximately equivalent proportions, or with an excess of the polyepoxide, a molding mixture can thus be made, particularly when a small amount of catalyst is added, which will give a final insoluble, infusible molded article.

The new complex polymeric epoxides produced by the two-step process and containing reactive epoxide groups, can be reacted with compounds containing active hydrogen, such as amines, and particularly polyamines, amides, mercaptans, polyhydric alcohols, polyimines, etc. to give a wide variety of valuable reaction products. Thus, difunctional reactants or polyfunctional reactants may serve to cross-link different molecules through reaction with terminal epoxide groups, and in some cases through intermediate hydroxyl groups. By using a difunctional reactant or polyfunctional reactant that reacts with epoxide groups but not with hydroxyl groups, in proportions equivalent to the epoxide groups, different molecules may be joined together by cross-linking in this way. Where cross-linking reagents are used that react with hydroxyl, or with both hydroxyl and epoxy groups, a different and more complex structure may be obtained. The use of less than the equivalent amount of cross-linking reagents enables modified products to be obtained, and in some cases infusible products.

Thus by compounding the intermediate complex epoxide compositions with an amount of polyhydric phenol, approximately equivalent to the epoxide content of the composition, and with the use of a small amount of catalyst such as the alkali salt of the polyhydric phenol, the resulting mixture on heating will cause reaction between the polyhydric phenol and the epoxide groups with resulting cross-linking and the production of higher molecular and infusible products.

The new complex reaction products of polyhydric phenols and polyepoxides of the two-step process and containing terminal epoxide groups can advantageously be reacted with amines to form valuable amine-epoxy reaction products which may be infusible products having valuable properties for making films, molded compositions, etc.

Other polyfunctional cross-linking reactants which react with epoxide groups or with hydroxyl groups or with both epoxide and hydroxyl groups can similarly be used for bringing about cross-linking which may be accompanied by further reaction of epoxide and hydroxyl groups to form high molecular weight products or infusible products including diisocyanates, e. g. methylene bis (4-phenyl) isocyanate, dialdehydes, e. g., glyoxal, dimercaptans, amides, polyamides, etc.

Thus the present invention provides a two-step process for producing new compositions and new reaction products which are valuable as raw materials in the manufacture of varnishes, molding resins, adhesives, fibers, filaments, etc. In general they are capable of polymerization particularly in the presence of catalysts and by the use of cross-linking reactants, and even in some cases without catalysts or cross-linking reactants to form insoluble, infusible final products.

Where the further reaction or polymerization of the complex epoxide compositions takes place through reaction of epoxide and hydroxyl groups, the final reaction or polymerization products may be free or relatively free from epoxy groups and contain only or mainly hydroxyl groups in addition to hydrocarbon residues and ether linkages. The reacted or polymerized products give compositions varying from hard, brittle, fusible solids to hard, non-brittle, infusible solids. The new complex compositions and reaction products react and polymerize to give final products containing a high percentage of hydroxyl groups.

The final infusible reaction and polymerization products made with the new compositions and the new reaction products of the two-step process have a remarkable combination of desirable properties including resistance to water, solvents, alkalies, and acids, toughness combined with hardness, flexibility at low temperatures, ability to withstand high temperatures with little or no discoloration, resistance to chemical, wettability to most pigments, low viscosity at high solids content of solutions, and hardening of thick films through chemical reactions within the film itself when a suitable catalyst or cross-linking reactant is used so that paint and varnish coatings far beyond the usual thickness can be applied.

This application is a continuation-in-part of my prior application Serial No. 626,449, filed November 2, 1945, now Patent No. 2,592,560.

I claim:

1. The two step process of making high melting point resins and final infusible products which comprises first reacting a dihydricphenol free from reactive groups other than phenolic hydroxyl groups with an excess of an aliphatic polyepoxide free from reactive groups other than epoxide and alcoholic hydroxyl groups to form a reaction product having terminal epoxide groups and further reacting this product with a further amount of such a dihydricphenol.

2. The process according to claim 1 in which the amount of dihydricphenol reacted with the polyepoxide in the second step of the process is less than that equivalent to the polyepoxide to form a high melting point epoxide resin.

3. The process according to claim 1 in which approximately equivalent proportions of dihydricphenol and polyepoxide are reacted in the second step of the process to form an infusible product.

4. A composition comprising essentially a dihydricphenol free from reactive groups other than phenolic hydroxyl groups and a polyepoxide resulting from the reaction of such a dihydricphenol with an excess of an aliphatic polyepoxide free from reactive groups other than epoxide and alcoholic hydroxyl groups.

5. The process according to claim 1 in which the dihydricphenol is bis phenol.

6. The process according to claim 2 in which the dihydricphenol is bis phenol.

7. The process according to claim 3 in which the dihydricphenol is bis phenol.

8. The process according to claim 1 in which the polyepoxide is diglycid ether.

9. The process according to claim 1 in which the dihydricphenol is hydroquinone.

10. The process to claim 1 in which the dihydricphenol is p,p$^1$ dihydroxy diphenyl sulfone.

11. A composition comprising essentially a dihydricphenol free from reactive groups other than phenolic hydroxyl groups and a polyepoxide resulting from the reaction of bis phenol with an excess of aliphatic polyepoxide free from reactive groups other than epoxide and aliphatic hydroxyl groups.

12. A composition comprising essentially a dihydricphenol free from reactive groups other than phenolic hydroxyl groups and a polyepoxide resulting from the reaction of hydroquinone with an excess of an aliphatic polyepoxide free from reactive groups other than epoxide and aliphatic hydroxyl groups.

13. A composition comprising essentially a dihydricphenol free from reactive groups other than phenolic hydroxyl groups and a polyepoxide resulting from the reaction of p,p$^1$ dihydroxy diphenyl sulfone with an excess of aliphatic polyepoxide free from reactive groups other than epoxide and aliphatic hydroxyl groups.

14. A composition comprising essentially bis phenol and a polyepoxide resulting from the reaction of a dihydricphenol free from reactive groups other than phenolic hydroxyl groups with an excess of aliphatic polyepoxide free from reactive groups other than epoxide and alcoholic hydroxyl groups.

15. A composition comprising essentially hydroquinone and a polyepoxide resulting from the reaction of a dihydricphenol free from reactive groups other than phenolic hydroxyl groups with an excess of aliphatic polyepoxide free from reactive groups other than epoxide and alcoholic hydroxyl groups.

16. A composition comprising essentially p,p$^1$ dihydroxy diphenyl sulfone and a polyepoxide resulting from the reaction of a dihydricphenol free from reactive groups other than phenolic hydroxyl groups with an excess of aliphatic polyepoxide free from reactive groups other than epoxide and alcoholic hydroxyl groups.

SYLVAN OWEN GREENLEE.

No references cited.